Patented Mar. 15, 1932                                    1,850,038

UNITED STATES PATENT OFFICE

HIROMU TANAKA, OF SUGINAMI-MACHI, TOYOTAMA-GUN, TOKYO, JAPAN

PROCESS OF PRODUCING POTASSIUM SULPHATE, AMMONIA SULPHATE, AND ALUMINA FROM ALUNITE

No Drawing. Application filed January 2, 1929, Serial No. 329,950, and in Japan January 13, 1928.

This invention relates to the process of producing potassium sulphate, ammonium sulphate and alumina from alunite, characterized in that alunite, after being calcined, is subjected to the action of ammonia which will produce ammonium sulphate; the said sulphate together with potassium sulphate, is lixiviated, its residue being treated with sulphurous acid at the heat of 60 to 70 degrees C., and the resulting aluminum sulphite solution is then, subjected to the heat of about 100 degrees C., aluminum being precipitated as a basic sulphite which is converted to alumina by calcination. Thus, this invention has, for its object, the utilization of every component of alunite in the most effective and useful manner.

Detailed description of the invention

Alunite is a mineral, the chief component of which is a basic alum as shown by the formula $3(Al_2O_3.SO_3)K_2SO_4.6H_2O$ and contains, as impurities, silica and iron oxide. The inventor as a result of his study has completed the process of utilizing any and all of alumina, potash, and sulphur trioxide contained in alunite which will be demonstrated in the following paragraphs. When alunite is heated at about 600° C. and treated with ammonia, decomposition sets in as shown in the equation which is $$3(Al_2O_3.SO_3).K_2SO_4 + 6(NH_4)OH = 3Al_2O_3 + 3(NH_4)_2SO_4 + K_2SO_4 + 3H_2O$$

and the potassium sulphate is separated from alumina together with the ammonium sulphate in the form of solution. Then as the next process, the residual alumina is treated with sulphurous acid when it readily dissolves and separates from silica resulting in aluminum sulphite solution, which when heated at about 100° C., liberates a greater part of $SO_2$ and the basic aluminum sulphite 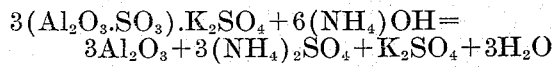 is thrown down. Lastly, pure alumina is obtained by heating the said precipitate at over 900° C.

Following is an example of working this invention.

Alunite is first powdered, and after being in a furnace at about 600° C., is placed in a covered vessel. The theoretical amount of ammonia moderately concentrated is added to the calcined alunite and agitation is continued for about one hour, then reaction heat is generated to a large extent resulting in ammonium sulphate caused by the reaction of ammonia on the alunite, which enters into solution together with potassium sulphate to the extent of more than 90 percent of the originally contained amount. The insoluble residue being separated by means of filter press or vacuum filter, the filtrate is evaporated and is made to crystallize into a mixture of ammonium and potassium sulphates which is to be used as a mixed fertilizer of potash and nitrogen. The insoluble residue above-mentioned which is an alumina containing silica and a small quantity of iron oxide, is transferred into an air-tight and lead-lined digester and after adding water 20 to 40 times the weight of alumina contained in the residue, is treated under ordinary or a few atmospheres pressure and at 60 to 70 degrees C. for 3 to 5 hours, by introducing into the solution, sulphur dioxide which is liberated during the decomposition of aluminum sulphite. By this treatment more than 80 per cent of alumina dissolves into sulphite solution. The solution is then clarified by filtration or decantation, and taken into a decomposer of a similar construction with the digester above-mentioned. Steam is then passed to a steam jacket or coil and temperature of the decomposer is kept at about 100° C. which liberates a greater part of $SO_2$ in the solution, and aluminum is completely precipitated in the form of

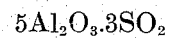

free from iron and easily filterable. Then the precipitate is passed into an air-tight filter such as filter press, washed and is lastly calcined, after being dried, at the heat over 900° C. when it is converted into pure alumina, liberating all of the combined sulphur dioxide and water. It is to be added that $SO_2$ gas emitting from the decomposer and calciner is to be recovered and is utilized for the process cyclically.

As described in the foregoing paragraphs, the process invented will enable all the alumina, potash and sulphur trioxide contained in alunite, to be utilized each as a valuable product.

Claims:

1. The process of manufacturing alumina, potassium sulphate and ammonium sulphate from alunite, which comprises calcining alunite at a temperature of approximately 600° C., reacting ammonia water with the calcined alunite to form potassium and ammonium sulphates and alumina containing impurities, filtering the solution to remove the aluminous residue, and then treating the aluminous residue with sulphurous acid for dissolving the alumina, boiling the solution thus obtained to cause precipitation of alumina as a basic sulphite and calcining the precipitate whereby pure alumina is obtained.

2. The process of manufacturing alumina, potassium sulphate and ammonium sulphate from alunite which comprises calcining the alunite at approximately 600° C., then reacting ammonia water with the calcined alunite while agitating the same to form potassium sulphate, ammonium sulphate and an insoluble residue containing alumina, removing the residue and adding water thereto, passing sulphur dioxide through the mixture of the residue and water at 60°–70° C. at approximately atmospheric pressure for dissolving alumina and forming a sulphite solution of aluminum, filtering the solution and heating the same for liberating a greater portion of the sulphur dioxide, while precipitating a basic sulphite of aluminum, and calcining the precipitate at about 900° C., thereby liberating the sulphur dioxide with the consequent residue of pure alumina.

In testimony whereof I have signed my name to this specification.

HIROMU TANAKA.